(12) United States Patent  (10) Patent No.: US 9,160,995 B2
Aoki  (45) Date of Patent: Oct. 13, 2015

(54) IMAGE DISPLAY DEVICE AND LIGHT EMISSION TIMING CONTROL METHOD

(75) Inventor: Kazuhiko Aoki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 424 days.

(21) Appl. No.: 13/578,944

(22) PCT Filed: Apr. 18, 2011

(86) PCT No.: PCT/JP2011/059500
§ 371 (c)(1),
(2), (4) Date: Aug. 14, 2012

(87) PCT Pub. No.: WO2011/136065
PCT Pub. Date: Nov. 3, 2011

(65) Prior Publication Data
US 2013/0038223 A1  Feb. 14, 2013

(30) Foreign Application Priority Data

Apr. 26, 2010 (JP) .................. 2010-100784

(51) Int. Cl.
*G02B 5/12* (2006.01)
*H04N 9/31* (2006.01)
(Continued)

(52) U.S. Cl.
CPC ............ *H04N 9/3194* (2013.01); *G03B 21/567* (2013.01); *G03B 21/60* (2013.01);
(Continued)

(58) Field of Classification Search
CPC ....................................... G02B 5/12
USPC ................ 315/153; 348/814, 655; 250/354.1, 250/458.1, 459.1, 483.1; 313/486; 382/274
See application file for complete search history.

(56) References Cited

U.S. PATENT DOCUMENTS 8,829,472 B2 * 9/2014 Ohta et al. ................. 250/458.1
2007/0187616 A1 8/2007 Hajjar et al.
(Continued)

FOREIGN PATENT DOCUMENTS

CN 1982946 A 6/2007
CN 101421661 A 4/2009
(Continued)

OTHER PUBLICATIONS

Chinese Office Action for CN Application No. 201180014953.8 issued on Jul. 28, 2014 with English Translation.
(Continued)

*Primary Examiner* — Hai L Nguyen
(74) *Attorney, Agent, or Firm* — Sughrue Mion, PLLC

(57) ABSTRACT

An image display device includes: excitation light source (5), fluorescent screen (6) provided with a plurality of phosphor regions (61, 62, 63) that are arranged periodically in the in-plane direction, the regions between phosphor regions being retroreflective regions (64) that bend incident light in the direction opposite the direction of incidence of the light; scanning means (4) that scans fluorescent screen (6) with a light beam from excitation light source (5); optical detection means (2, 3) that detects retroreflective light (7) that is reflected by retroreflective regions (64); and control means (1) that causes scanning by scanning means (4), detects boundaries between each phosphor region (61, 62, 63) and retroreflective region (64) on fluorescent screen (6) based on output of optical detection means (2, 3), and controls the light emission timing of excitation light source (5) based on the detected boundaries.

18 Claims, 13 Drawing Sheets

(51) Int. Cl.
  *G03B 21/56* (2006.01)
  *G03B 21/60* (2014.01)
  *G09G 3/02* (2006.01)
  *G03B 33/16* (2006.01)

(52) U.S. Cl.
  CPC .............. *G03B 33/16* (2013.01); *G09G 3/025* (2013.01); *H04N 9/31* (2013.01); *H04N 9/3129* (2013.01); *G09G 2320/0693* (2013.01); *G09G 2320/08* (2013.01); *G09G 2360/145* (2013.01)

(56) References Cited

U.S. PATENT DOCUMENTS

| | | |
|---|---|---|
| 2009/0001272 A1 | 1/2009 | Hajjar et al. |
| 2010/0118369 A1 | 5/2010 | Takayama |

FOREIGN PATENT DOCUMENTS

| | | |
|---|---|---|
| EP | 1 914 712 A1 | 4/2008 |
| JP | S5489525 A | 7/1979 |
| JP | H04134874 A | 5/1992 |
| JP | 2009537868 A | 10/2009 |
| JP | 2009539120 A | 11/2009 |
| WO | 2007095329 A | 8/2007 |
| WO | 2007134329 A2 | 11/2007 |
| WO | 2009003192 A | 12/2008 |
| WO | 2009004991 A | 1/2009 |

OTHER PUBLICATIONS

The international search report for PCT/JP2011/059500.

* cited by examiner

IMAGE DISPLAY DEVICE AND LIGHT EMISSION TIMING CONTROL METHOD

TECHNICAL FIELD

The present invention relates to an image display device in which a fluorescent screen on which phosphor is formed in each of the regions that are partitioned in stripe or matrix form is scanned by an excitation light to display an image.

BACKGROUND ART

In an image display device in which a fluorescent screen is scanned by an excitation light to display an image, the relative positional relationship between the scanning system and the fluorescent screen typically changes due to various causes such as vibration, distortion, or changes in the environment such as temperature or humidity, the influence of gravity, or changes over the passage of years, whereby the appropriate irradiation beam timing becomes difficult to maintain and image quality deteriorates.

In Patent Documents 1 and 2, image display devices are described that include: a fluorescent screen; an optical module that scans the fluorescent screen with a laser beam (excitation light); an optical sensor that detects the excitation light (feedback light) that is reflected by a reflection means on the fluorescent screen and generates a monitor signal for detecting the position of the laser beam on the fluorescent screen; and a feedback control unit that, based on the monitor signal from this optical sensor, controls the ON/OFF timing (light emission timing) of the laser beam in the optical module. The fluorescent screen includes a plurality of phosphor stripes and a reflection means that is provided between each of the phosphor stripes.

In the above-described image display device, an image is displayed by scanning the fluorescent screen in a direction orthogonal to the phosphor stripes by an excitation light beam (optical pulse) that is modulated based on a modulated signal to excite the phosphor of each phosphor stripe. In the feedback control, while carrying out this image display, a delay process is carried out on the modulated signal such that the position of each optical pulse moves back and forth in the scanning direction on the fluorescent screen. By means of this delay process, the output value of the optical sensor changes in accordance with the position of the beam with respect to each phosphor stripe. The optimum light emission timing is obtained based on the change in output of this optical sensor.

LITERATURE OF THE PRIOR ART

Patent Documents

Patent Document 1: Japanese Unexamined Patent Application Publication (Translation of PCT Application) No. 2009-537868

Patent Document 2: Japanese Unexamined Patent Application Publication (Translation of PCT Application) No. 2009-539120

SUMMARY OF THE INVENTION

However, in the feedback control of the above-described image display device, the delay process is carried out such that, by means of a modulated signal, periodic back and forth movement of each optical pulse in the scanning direction on the fluorescent screen is caused to occer, and the delay process therefore causes the timing of irradiation of the phosphor stripe by means of the excitation light to always have a periodic error with respect to the ideal irradiation timing. As a result, the amount of excitation light that irradiates the phosphor stripe fluctuates periodically and the amount of fluorescence fluctuates with this fluctuation, thus leading to deterioration of image quality of the displayed image.

In addition, due to the periodic timing error, the maximum luminance that can be realized by this feedback control is lower than the maximum luminance during ideal irradiation timing.

It is therefore an object of the present invention to provide an image display device and light emission timing control method that can maintain appropriate beam irradiation timing without lowering image quality or luminance and thus solve the above-described problems.

The image display device of the present invention for achieving the above-described object includes:
an excitation light source;
a fluorescent screen that is provided with a plurality of phosphor regions arranged periodically in the in-plane direction, regions between each phosphor region being reflection regions that reflect incident light in the direction opposite the direction of incidence of the light;
scanning means that, by means of a light beam from the excitation light source, scans the surface of the fluorescent screen in which each of the phosphor regions is formed;
first and second optical detection means that detect reflected light that is reflected by the reflection regions; and
control means that causes scanning by means of the scanning means to detect the boundaries between each of the phosphor regions and the reflection regions on the fluorescent screen based on the output of the first and second optical detection means, and controls the light emission timing of the excitation light source based on the detected boundaries;
wherein the first and second optical detection means are arranged along a plane that intersects with the reflected light and are aligned in a first direction that is a direction that intersects with the boundaries, the first direction being determined by the relative positional relationship with the fluorescent screen.

The light emission timing control method of the present invention includes:
scanning, by means of a light beam from an excitation light source, a surface of a fluorescent screen in which each of phosphor regions are formed, the fluorescent screen being provided with a plurality of phosphor regions that are arranged periodically in the in-plane direction and regions between each of the phosphor regions being reflection regions that bend incident light in a direction that is opposite the direction of incidence of the light;
detecting reflected light from the reflection regions at the time of scanning using a first and second optical detection means that are arranged along a plane that intersects with the reflected light and are aligned in a first direction that is a direction that intersects with the boundaries of each of the phosphor regions and the reflection regions, the first direction being determined by the relative positional relationship with the fluorescent screen; and
detecting the boundaries between each of the phosphor regions and the reflection regions on the fluorescent screen based on the output of the first and second optical detection means and controlling the light emission timing of the excitation light source based on the detected boundaries.

Figure 1:
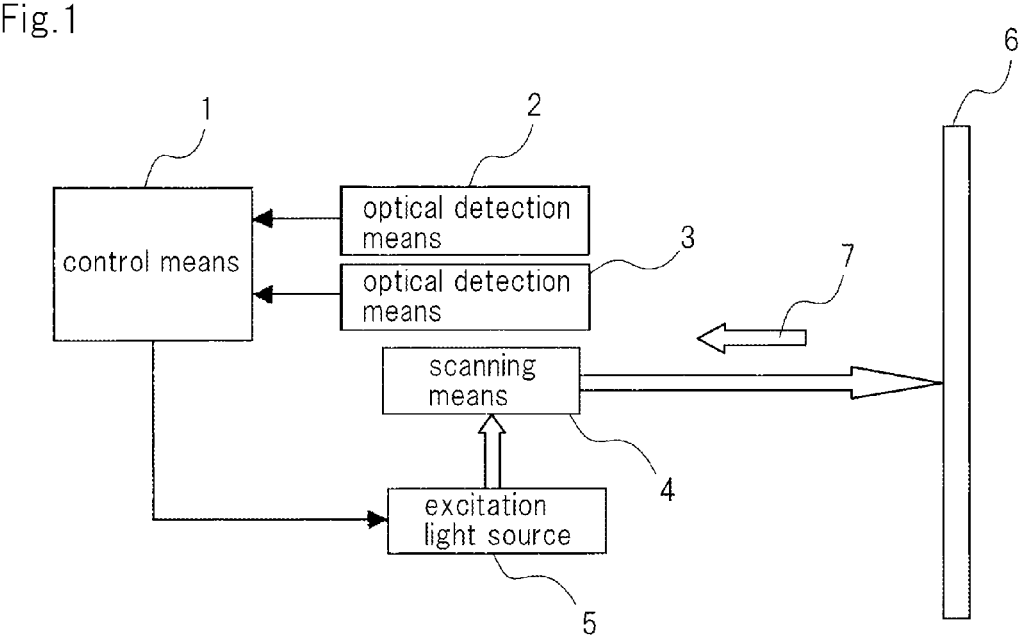
FIG. 1 is a block diagram showing the configuration of the image display device that is the first exemplary embodiment of the present invention.

EXPLANATION OF REFERENCE NUMBERS 1 control means
2, 3 optical detection means
4 scanning means
5 excitation light source
6 fluorescent screen
7 retroreflected light

BEST MODE FOR CARRYING OUT THE INVENTION

Exemplary embodiments of the present invention are next described with reference to the accompanying drawings.

First Exemplary Embodiment

FIG. 1 is a block diagram showing the configuration of the image display device that is the first exemplary embodiment of the present invention.

Referring to FIG. 1, the image display device includes control means 1, optical detection means 2 and 3, scanning means 4, excitation light source 5, and fluorescent screen 6.

Excitation light source 5 supplies excitation light that excites phosphors formed on fluorescent screen 6 and is a laser light source of which, for example, a laser diode (LD) is representative. Scanning means 4 scans fluorescent screen 6 by the light beam (excitation light) from excitation light source 5 and is, for example, a polygon mirror or galvano mirror.

Fluorescent screen 6 is provided with a plurality of phosphor regions that are arranged periodically in the in-plane direction, and regions between phosphor regions are reflective regions that bend incident light in the direction opposite the direction of incidence of the light.

Figure 2:
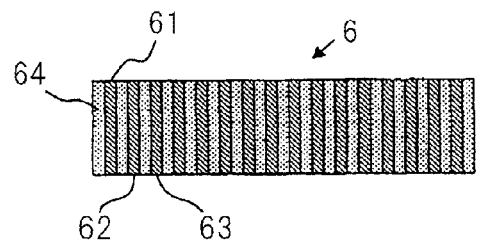
FIG. 2 is a schematic view showing a portion of the fluorescent screen of the image display device shown in FIG. 1.

FIG. 2 shows the actual configuration of a portion of fluorescent screen 6. As shown in FIG. 2, fluorescent screen 6 has a plurality of phosphor regions 61-63 partitioned by black stripes, and retroreflective regions 64 are provided on the surfaces of black stripes into which excitation light is irradiated. Phosphor region 61 is a region in which a phosphor is formed that emits, for example, red fluorescent light. Phosphor region 62 is a region in which a phosphor is formed that emits, for example, green fluorescent light. Phosphor region 63 is a region in which a phosphor is formed that emits, for example, blue fluorescent light. In the example shown in FIG. 2, phosphor regions 61, 62, and 63 are formed periodically in a specific direction in this order.

Figure 3A:
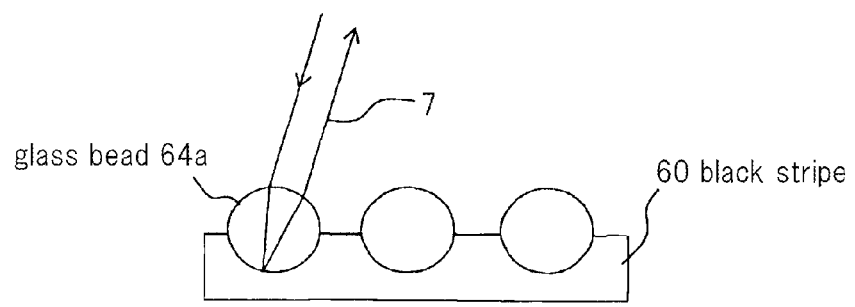
FIG. 3A is a schematic view showing an example of a retroreflective region of the image display device shown in FIG. 1.

FIG. 3A shows an example of retroreflective region 64.

Referring to FIG. 3A, retroreflective region 64 is composed of a plurality of glass beads 64a provided on black stripe 60. Glass beads 64a are spheres, a roughly hemispherical portion of each sphere being embedded in the surface of black stripe 60. The remaining hemispherical portion of each glass bead 64a is exposed from the surface of black stripe 60.

When a light beam (excitation light) from excitation light source 5 is transmitted to black stripe 60, the light beam is incident to the exposed surface of glass bead 64a. The incident light is refracted at the surface-side interface (the boundary between the surface of glass bead 64a and air). The light that is irradiated into glass bead 64a is reflected at the interface of glass bead 64a and black stripe 60 and this reflected light is then emitted from the surface-side interface. The reflected light is refracted when passing though the surface-side interface, and the emitted light from this interface advances as retroreflected light 7 in the direction opposite that of the incident light.

In order to reflect light that is entered into glass bead 64a at the interface of glass bead 64a and black stripe 60, a reflective material may be included in black stripe 60. Alternatively, the entire spherical surface of glass bead 64a may be covered by a semi-transmissive/semi-reflective film.

By designing glass beads 64a such that a focal point is formed at one point of the interface between glass bead 64a and black stripe 60, retroreflected light 7 can reliably be caused to advance in the direction opposite that of the incident light.

Retroreflective region 64 that is composed of glass beads 64a of this type can be formed by using screen printing.

Figure 3B:
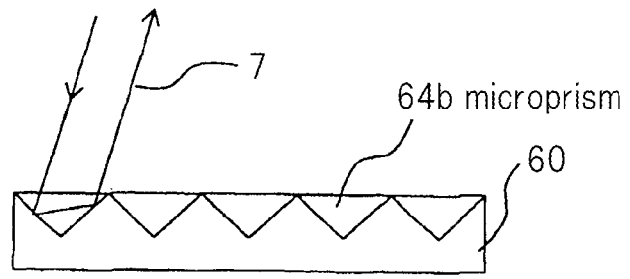
FIG. 3B is a schematic view showing another example of the retroreflective region of the image display device shown in FIG. 1.

FIG. 3B shows another example of retroreflective region 64.

Referring to FIG. 3B, retroreflective region 64 is composed of microprisms 64b provided on black stripe 60. Microprisms 64b are composed of a plurality of prisms having a triangular cross section, the apical angle of each prism being 90°. Microprisms 64b are formed such that the apical angle side of each prism is embedded in black stripe 60 and a plane (surface of incidence/emission) is formed by the base of each prism.

When the light beam (excitation light) from excitation light source 5 is transmitted to black stripe 60, the light beam is incident to the surface of incidence/emission of microprisms 64b. Reflective film is formed on the two surfaces that make up the apical angle of microprisms 64b. Light that is incident to microprisms 64b, after being reflected by one surface of the two surfaces that make up the apical angle, is reflected by the other surface. The reflected light from the other surface is exited from the surface of incidence/emission. The exited light from the surface of incidence/emission advances as retroreflected light 7 in the direction opposite that of the incident light.

The retroreflective region realized by microprisms 64b shown in FIG. 3B can obtain a higher retroreflectivity than the retroreflective region realized by glass beads 64a shown in FIG. 3A.

Again referring to FIG. 1, optical detection means 2 and 3 are made up of photodiodes and detect retroreflected light 7 that is reflected by retroreflective region 64.

Optical detection means 2 and 3 are arranged along a plane that intersects with retroreflected light 7 and that is aligned along a direction that corresponds to the direction that intersects with or that is orthogonal to the boundaries between phosphor regions 61, 62, and 63 and retroreflective regions 64 (or the black stripes) determined by the relative positional relationship with fluorescent screen 6.

For example, optical detection means 2 and 3 may be arranged to face the surface of fluorescent screen 6 on which retroreflective regions 64 are formed and may directly detect a portion of retroreflected light 7 from retroreflective regions 64. In this case, when viewed from a direction that is perpendicular to the plane that intersects with retroreflected light 7, optical detection means 2 and 3 are arranged aligned in a direction that intersects with or that is orthogonal to the boundaries between phosphor regions 61, 62, and 63 and retroreflective regions 64 (or the black stripes).

Alternatively, optical detection means 2 and 3 may detect retroreflected light 7 from retroreflective region 64 by way of optics. In this case, when fluorescent screen 6 is viewed via optics from a direction perpendicular to the plane that intersects with retroreflected light 7, optical detection means 2 and 3 are arranged along this plane aligned in a direction that intersects with or that is orthogonal to the boundaries between phosphor regions 61, 62, and 63 and retroreflective regions 64 (or the black stripes).

Control means 1 acquires a waveform that shows the difference between the output waveforms of optical detection means 2 and 3; based on this differential waveform, detects the boundaries between phosphor regions 61, 62, and 63 and retroreflective regions 64 on fluorescent screen 6 (corresponding to the boundaries between the phosphor regions and the black stripes); and controls the light emission timing of excitation light source 5 based on the detected boundaries.

The boundaries between phosphor regions 61, 62, and 63 and retroreflective regions 64 can be acquired based on, for example, the positions of the peaks of the differential waveform of optical detection means 2 and 3. In this case, the positions of the peaks of the differential waveform of optical detection means 2 and 3 indicate the relative positions of the spots of the light beam with respect to the boundaries between phosphor regions 61, 62, and 63 and retroreflective regions 64 on fluorescent screen 6.

Optical detection means 2 and 3 may be arranged at any position that allows the detection of the boundaries between phosphor regions 61-63 and retroreflective regions 64 based on their differential waveform.

The operations of the light emission timing control of the image display device of the present exemplary embodiment are next described.

Figure 4:
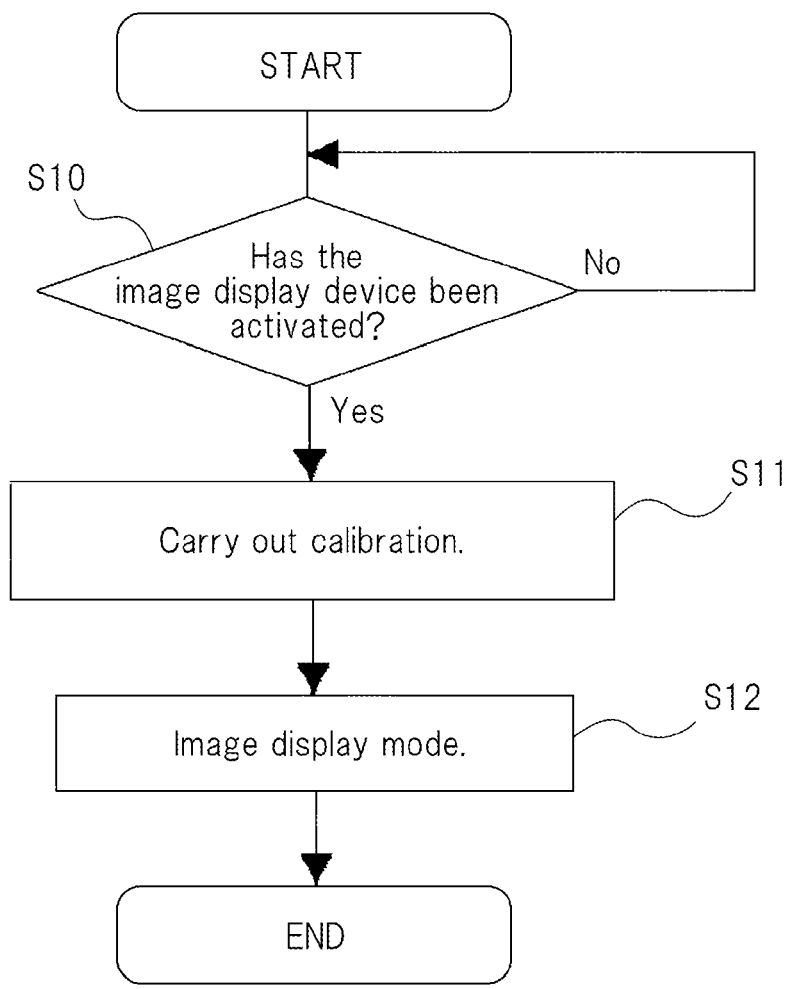
FIG. 4 is a flow chart showing the procedures of light emission timing control that are carried out in the image display device shown in FIG. 1.

FIG. 4 is a flow chart showing the procedures of the light emission timing control.

Control means 1 judges whether or not the image display device has been activated (Step S10). The image display device is provided with a button for the introduction of power (not shown) and control means 1 carries out the judgment of Step S10 according to whether or not this button has been pressed.

When the image display device is activated, control means 1 implements calibration (Step S11). This calibration is carried out as shown below.

Control means 1 both causes excitation light source 5 to continuously supply excitation light of a fixed quantity for a fixed interval and causes scanning means 4 to scan fluorescent screen 6 by the excitation light. Here, the fixed interval is, for example, an interval equivalent to one frame.

During the above-described scanning, control means 1 acquires a waveform indicating the differential between the output waveforms of optical detection means 2 and 3, and based on the differential waveform, detects the boundaries between phosphor regions 61, 62, and 63 and retroreflective regions 64 for all phosphor regions 61, 62, and 63 on fluorescent screen 6. Control means 1 then creates boundary positional data (initial values) based on the detection results and saves this data.

In the above-described calibration, control means 1 may create the boundary positional data in the scan of one frame, or may create a plurality of items of boundary positional data for each frame in scanning that covers a plurality of frames and then average this boundary positional data.

After implementing calibration, an image display mode is set for displaying images based on an input video signal. In this image display mode, control means 1 both controls the light emission timing of excitation light source 5 and controls scanning by scanning means 4 to bring about display of images based on the input video signal on fluorescent screen 6.

In image display mode, when displaying a first image based on the image data of the first input frame, control means 1 controls the light emission timing of excitation light source 5 based on the boundary positional data that were acquired in calibration. Then, during execution of the display process of the first image, control means 1 detects the boundaries between phosphor regions 61, 62, and 63 and retroreflective regions 64 for all phosphor regions 61, 62, and 63 on fluorescent screen 6 based on the differential waveform of optical detection means 2 and 3 and updates the boundary positional data based on these detection results.

When displaying an image based on image data of the second and succeeding input frames, control means 1 controls the light emission timing of excitation light source 5 based on the boundary positional data that were updated in the preceding image display. Then, during execution of the display process of the current image, control means 1 detects the boundaries between phosphor regions 61, 62, and 63 and retroreflective regions 64 for all phosphor regions 61, 62, and 63 on fluorescent screen 6 based on the differential waveform of optical detection means 2 and 3 and updates the boundary positional data based on these detection results. This updated boundary positional data is used in the next image display.

Although the above-described updating of boundary positional data is carried out for each frame, the present invention is not limited to this form. Updating of the boundary positional data may be carried out for each of a plurality of frames.

In the light emission timing control procedure shown in FIG. 4, in addition to following activation, calibration can also be carried out at the time of recovery after another mode in which image display is not carried out, such as a halt mode.

According to the image display device of the present exemplary embodiment, the boundaries of phosphor regions 61, 62, and 63 and retroreflective regions 64 are detected while scanning fluorescent screen 6 by a light beam from excitation light source 5 to display images, and based on these detected boundaries, the light emission timing of excitation light source 5 can be controlled during the next scanning (the image display of the next input frame). According to this control, a light beam can always be irradiated upon phosphor regions 61, 62, and 63 at the optimum timing.

In the feedback control of an image display device as disclosed in previously described Patent Documents 1 and 2, the position of the spot of the light beam in the scanning direction on fluorescent screen 6 was periodically moved back and forth by a modulated signal, but in the image display device of the present exemplary embodiment, this type of control is unnecessary and deterioration in image quality and luminance such as in the image display devices described in Patent Documents 1 and 2 can be prevented.

Second Exemplary Embodiment

Figure 5:
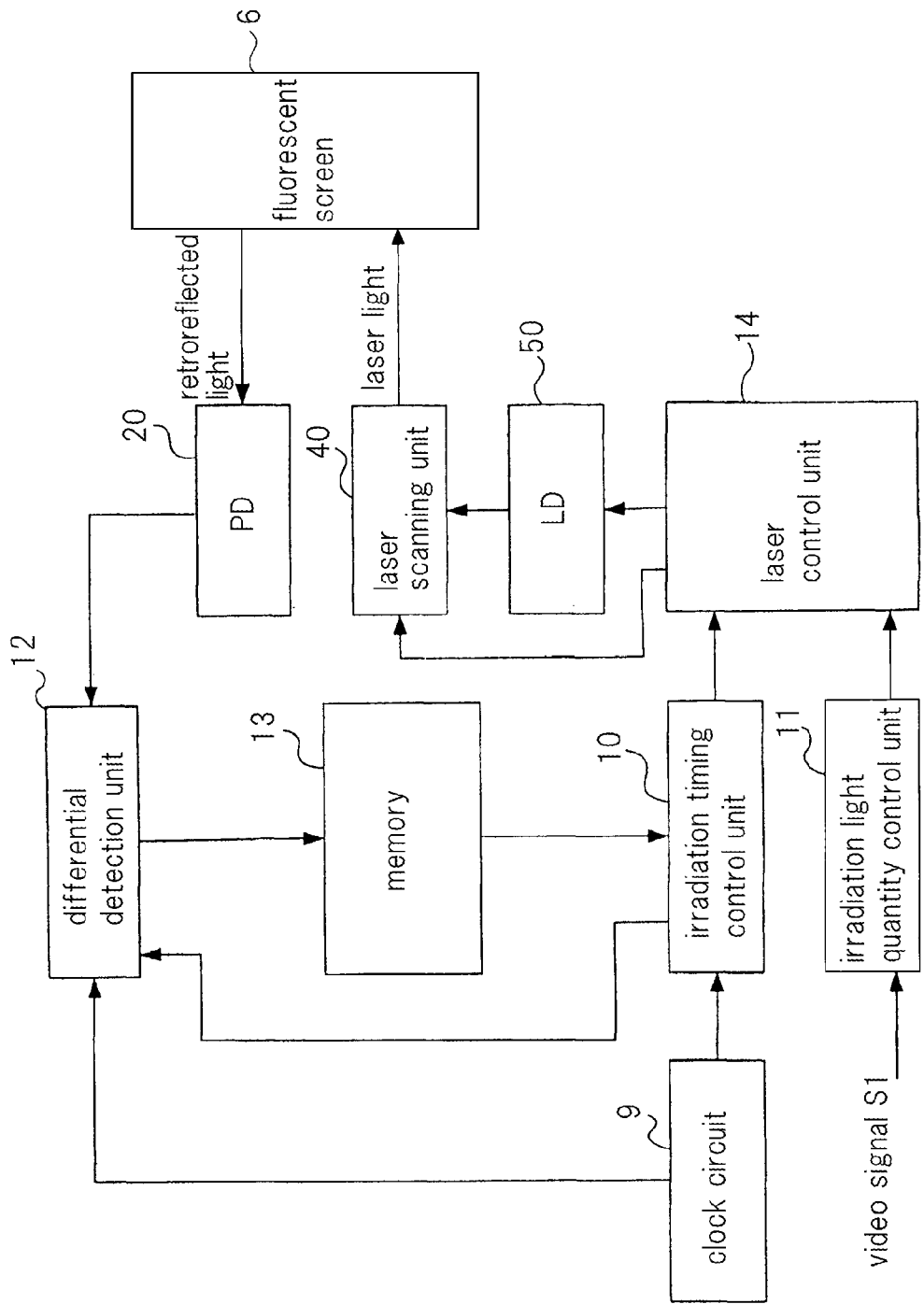
FIG. 5 is a block diagram showing the configuration of the image display device that is the second exemplary embodiment of the present invention.

FIG. 5 is a block diagram showing the configuration of the image display device that is the second exemplary embodiment of the present invention.

Referring to FIG. 5, the image display device includes fluorescent screen 6, clock circuit 9, irradiation timing control unit 10, irradiation light quantity control unit 11, differential detection unit 12, memory 13, laser control unit 14, PD (photodiode) 20, laser scanning unit 40, and LD (Laser Diode) 50.

Fluorescent screen 6 is the same as the screen used in the image display device of the first exemplary embodiment. As shown in FIG. 2, fluorescent screen 6 has a plurality of phosphor regions 61-63 that are partitioned by black stripes, retroreflective regions 64 being provided in the regions of the black stripes.

Irradiation timing control unit 10, irradiation light quantity control unit 11, differential detection unit 12, memory 13, and laser control unit 14 correspond to control means 1 of the image display device of the first exemplary embodiment. Memory 13 may be provided separately from control means 1.

Laser scanning unit 40 and LD 50 correspond to scanning means 4 and excitation light source 5, respectively, of the image display device of the first exemplary embodiment.

Figure 6:
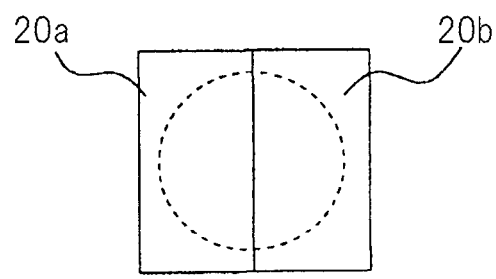
FIG. 6 is a schematic view showing an example of the photodiode of the image display device shown in FIG. 5.

PD 20 corresponds to optical detection means 2 and 3 of the image display device of the first exemplary embodiment. FIG. 6 shows one example of PD 20. In FIG. 6, the spot (a circle indicated by a dotted line) of retroreflected light 7 is shown for convenience.

Referring to FIG. 6, PD 20 is a component in which a rectangular PD light-receiving surface is split into two, and PD 20 thus includes two light-receiving surfaces 20a and 20b. Light-receiving surfaces 20a and 20b correspond to optical detection means 2 and 3 in the first exemplary embodiment. Light-receiving surfaces 20a and 20b are arranged along a plane that intersects with retroreflected light 7 from retroreflective region 64 and are aligned in a direction that corresponds to the direction that intersects with or that is orthogonal to the boundaries of phosphor regions 61, 62, and 63 and retroreflective regions 64 (or black stripes).

For example, when light-receiving surfaces 20a and 20b face fluorescent screen 6, when viewed from a direction that is perpendicular to the surface of fluorescent screen 6 on which retroreflective regions 64 are formed, light-receiving surfaces 20a and 20b are arranged aligned in a direction that intersects with or that is orthogonal to the boundaries of phosphor regions 61, 62, and 63 and retroreflective regions 64 (or black stripes).

Alternatively, light-receiving surfaces 20a and 20b may detect retroreflected light 7 from retroreflective regions 64 via optics. In this case, light-receiving surfaces 20a and 20b are arranged along a plane that intersects with retroreflected light 7 from the optics. When fluorescent screen 6 is viewed through the optics from a direction perpendicular to this plane, light-receiving surfaces 20a and 20b are arranged aligned in a direction that intersects with or that is orthogonal to the boundaries between phosphor regions 61, 62, and 63 and retroreflective regions 64 (or black stripes).

In PD 20, a first output that corresponds to the light quantity that is received at light-receiving surface 20a and a second output that corresponds to the light quantity received at light-receiving surface 20b are separately supplied to differential detection unit 12.

Differential detection unit 12 derives the difference of the waveforms between the first and second outputs from PD 20 and, based on this differential waveform, detects the boundaries of phosphor regions 61, 62, and 63 and retroreflective regions 64 on fluorescent screen 6. During calibration, differential detection unit 12 creates a one-screen portion of stripe boundary positional information based on the detected boundary information and stores the information in memory 13. In the image display mode, differential detection unit 12 updates the stripe boundary positional information that is stored in memory 13 based on the detected boundary information.

More specifically, differential detection unit 12 detects the peaks of the differential waveform of the first and second outputs from PD 20, and based on information of timing of the appearance of these peaks, creates or updates stripe boundary positional information. The detection of the peaks is carried out by, for example, a hold circuit and a reset signal. The interval from the vicinity of the center of a stripe until the vicinity of the center of the next stripe is the peak detection interval, and the hold circuit holds the highest value of the differential waveform of this interval. At the termination of a peak detection interval, the value that is held by the hold circuit is supplied as the peak detection value and the hold circuit is then reset by means of a reset signal. The appearance timing information of peaks is the result of counting (count value) the time interval from a depiction starting time to the time of appearance of a peak based on clock signals from clock circuit 9. The depiction starting time is given based on a depiction starting timing signal from irradiation timing control unit 10.

Based on the stripe boundary positional information that is stored in memory 13, irradiation timing control unit 10 both supplies an irradiation timing designation signal for controlling the drive timing (light emission timing) of LD 50 to laser control unit 14 and supplies a depiction start timing signal to differential detection unit 12.

Based on a video signal from the outside, irradiation light quantity control unit 11 supplies an irradiation light quantity designation signal for controlling the magnitude (corresponding to light quantity) of drive power that is to be supplied to LD 50 to laser control unit 14.

Laser control unit 14 both drives LD 50 in accordance with the irradiation timing designation signal from irradiation timing control unit 10 and adjusts the drive power to LD 50 in accordance with the irradiation light quantity designation signal from irradiation light quantity control unit 11. Laser control unit 14 further controls laser scanning unit 40 in accordance with the irradiation timing designation signal from irradiation timing control unit 10.

Figure 7:
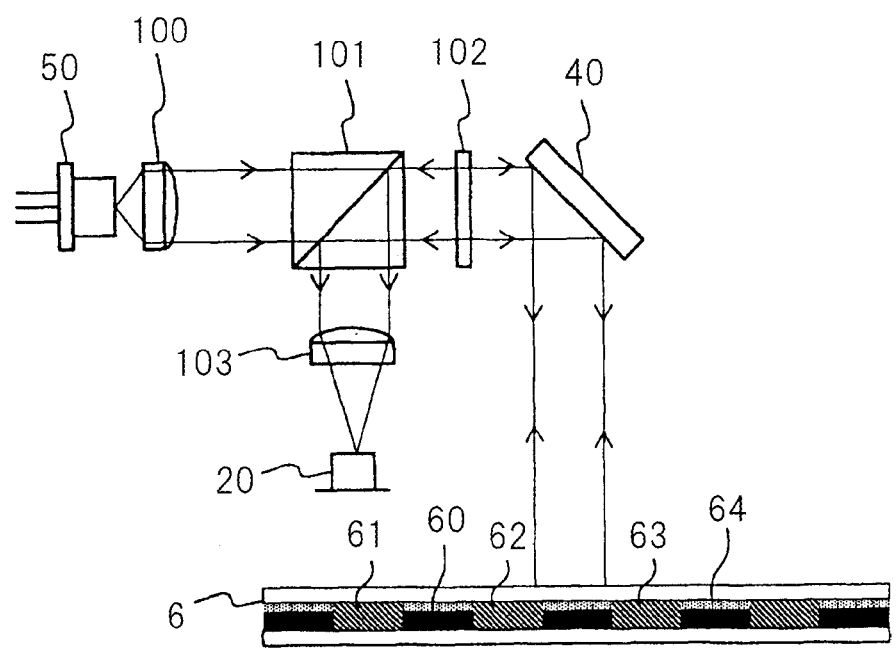
FIG. 7 is a schematic view showing an example of the optics of the image display device shown in FIG. 5.

FIG. 7 is a schematic view showing an example of the optics of the image display device of the present exemplary embodiment.

Referring to FIG. 7, collimator lens 100, polarization beam splitter (PBS) 101, quarter-wave plate 102, and laser scanning unit 40 are arranged in that order in the direction of advance of the light beam from LD 50.

The light beam from LD 50 is converted to parallel luminous flux by collimator lens 100. The parallel luminous flux from collimator lens 100 is supplied to PBS 101. PBS 101 transmits light of the P-polarized light component of the light beam from LD 50 and reflects the light of the S-polarized light component. Alternatively, PBS 101 may transmit the S-polarized light component and reflect the P-polarized light component.

Light of the P-polarized light component that has passed through PBS 101 is supplied to laser scanning unit 40 by way of quarter-wave plate 102. Laser scanning unit 40 scans fluorescent screen 6 by the light (circularly polarized light) from quarter-wave plate 102.

Figure 8:
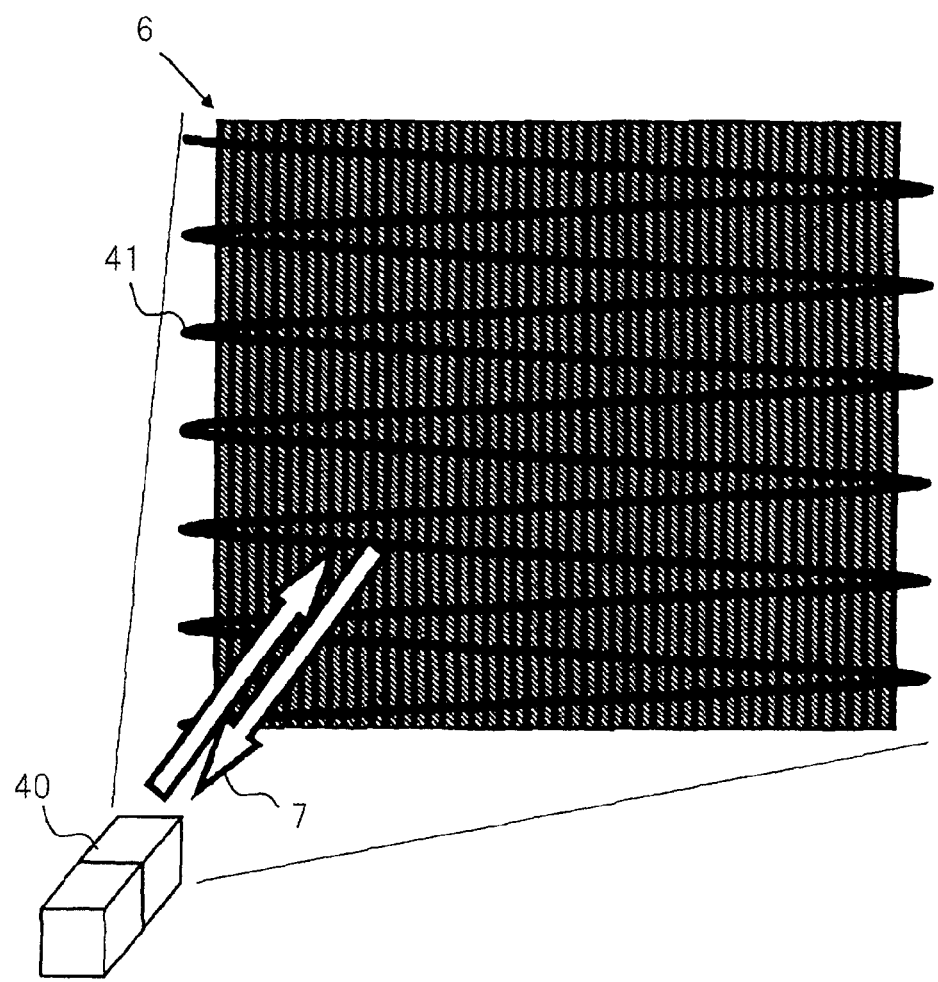
FIG. 8 is a schematic view showing the state of scanning fluorescent screen 6 by a light beam from the laser scanning unit in the image display device shown in FIG. 5.

FIG. 8 shows the state of scanning fluorescent screen 6 by the light beam from laser scanning unit 40.

In the example shown in FIG. 8, the depiction start position is assumed to be the upper left of fluorescent screen 6. The light beam from laser scanning unit 40 moves in a direction that intersects with the longitudinal direction of each of phosphor regions 61-63 on fluorescent screen 6. As shown by track 41 shown in FIG. 8, as viewed in the figure, the spot of the light beam moves from the left end to the right end, and upon reaching the right end, moves from the right end to the left end. This type of scanning is carried out continuously from top to bottom.

When the light beam from laser scanning unit 40 is irradiated into each of phosphor regions 61-63, the phosphor is excited and fluorescent light is emitted. When the light beam from laser scanning unit 40 is irradiated in retroreflective region 64 that is formed on black stripe 60, the incident light is reflected in the direction opposite the direction of incidence.

Figure 9:
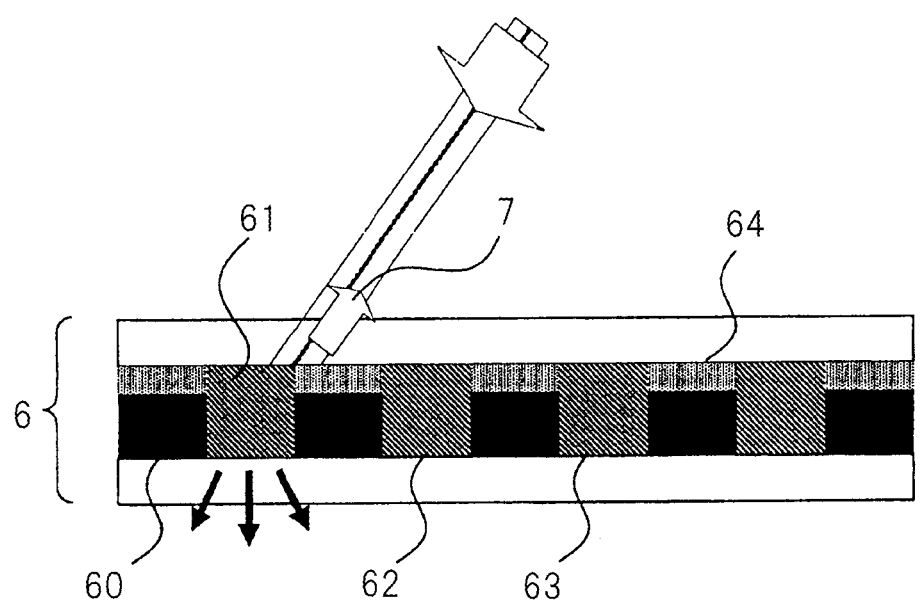
FIG. 9 is a schematic view showing the state when a light beam is irradiated onto the boundary portion of a phosphor region and a retroreflective region from the laser scanning unit in the image display device shown in FIG. 5.

FIG. 9 gives a schematic representation of the state when the light beam from laser scanning unit 40 is irradiated to the boundary of phosphor region 61 and retroreflective region 64. When the light beam is transmitted to phosphor region 61 and a portion of the light beam is cast upon retroreflective region 64, the light of the portion that is cast upon retroreflective region 64 is reflected by retroreflective region 64. With the movement of the spot of the light beam, the range of the beam that is cast upon retroreflective region 64 increases, leading to an increase in the quantity of light of retroreflected light 7. When the spot of the light beam subsequently moves further, the range of the beam that is cast upon retroreflective region 64 gradually decreases, and this leads to a decrease of the light quantity of retroreflected light 7.

As shown in FIG. 7, retroreflected light 7 from retroreflective region 64 is entered into PBS 101 via laser scanning unit 40 and quarter-wave plate 102. Retroreflected light 7 from retroreflective region 64 is circularly polarized light, but passage through quarter-wave plate 102 converts the light to the light of an S-polarized light component.

Retroreflected light 7 of the S-polarized light component that has passed through quarter-wave plate 102 is reflected in the direction of PD 20 by PBS 101. The retroreflected light 7 that is reflected by PBS 101 is focused on the light-receiving surface of PD 20 by condenser lens 103.

PD 20 includes light-receiving surfaces 20a and 20b as shown in FIG. 6. Light-receiving surfaces 20a and 20b are arranged along a plane that intersects with retroreflected light 7 and are aligned in a direction that corresponds to a direction that intersects with or that is orthogonal to the boundaries between phosphor regions 61, 62, and 63 and retroreflective regions 64 (or black stripes 60).

By means of PD 20 of this type of configuration, when a light beam of a fixed light quantity from laser scanning unit 40 passes through the boundaries of each of phosphor regions 61-63 and retroreflective regions 64, the output waveform of light-receiving surface 20a or 20b becomes a waveform that gradually rises and then suddenly falls while the other output waveform becomes a waveform that suddenly rises and then gradually falls. The positions of the peaks in the differential waveform of the outputs of these light-receiving surfaces 20a and 20b correspond to the boundaries between each of phosphor regions 61-63 and retroreflective region 64.

In the image display device of the present exemplary embodiment, the above-described principles are used to detect the boundaries between phosphor regions 61-63 and retroreflective regions 64, and the light emission timing of LD 50 is then controlled based on the detected boundaries.

In the image display device of the present exemplary embodiment, as in the first exemplary embodiment, control of the light emission timing in the image display mode is implemented after carrying out calibration.

Figure 10:
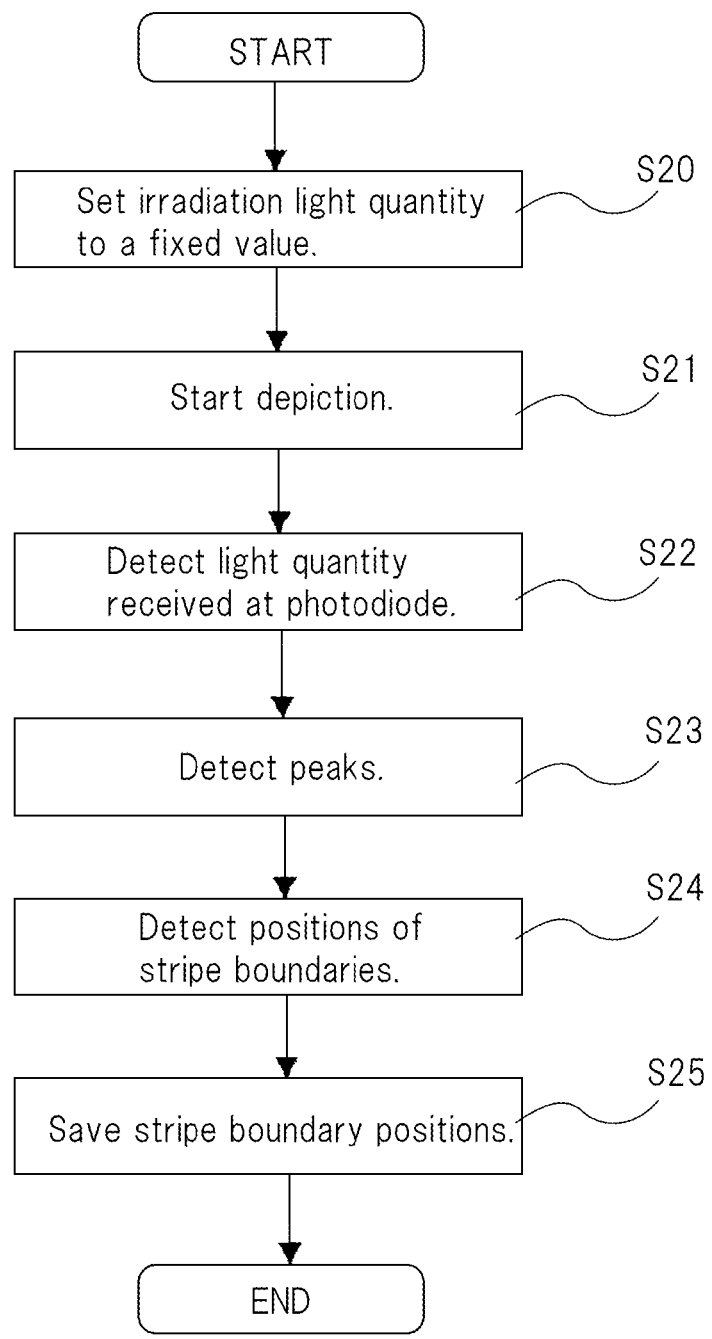
FIG. 10 is a flow chart showing the procedure of creating stripe boundary positional information that is carried out at the time of calibration of the image display device shown in FIG. 5.

FIG. 10 is a flow chart showing the procedure of creating stripe boundary positional information at the time of calibration.

Referring to FIG. 10, irradiation light quantity control unit 11 first supplies to laser control unit 14 an irradiation light quantity designation signal indicating that the irradiation light quantity is to be a fixed value. Laser control unit 14 then sets the drive power of LD 50 to a fixed value in accordance with the irradiation light quantity designation signal (Step S20).

Next, irradiation timing control unit 10 both supplies a depiction start timing signal to differential detection unit 12 and supplies an irradiation timing designation signal for controlling the drive timing of LD 50 to laser control unit 14 (Step S21). The irradiation timing designation signal in this case is a signal indicating that LD 50 is to be caused to emit light continuously for a fixed interval. In this case, the fixed interval is an interval equivalent to, for example, one frame.

PD 20 next detects retroreflected light 7 (Step S22), and differential detection unit 12 detects the peaks of the differential waveform of the first and second outputs from PD 20 (Step S23). Differential detection unit 12 then detects the stripe boundary positions based on the timing of the appearance of peaks in the differential waveform (Step S24). The stripe boundary positions can be found, for example, from the results of counting the time interval from the depiction start time point, up to the peak appearance time point, based on clock signals from clock circuit 9.

Finally, differential detection unit 12 creates stripe boundary positional information based on the detection results of the stripe boundary positions and stores this stripe boundary positional information in memory 13 (Step S25).

Figure 11:
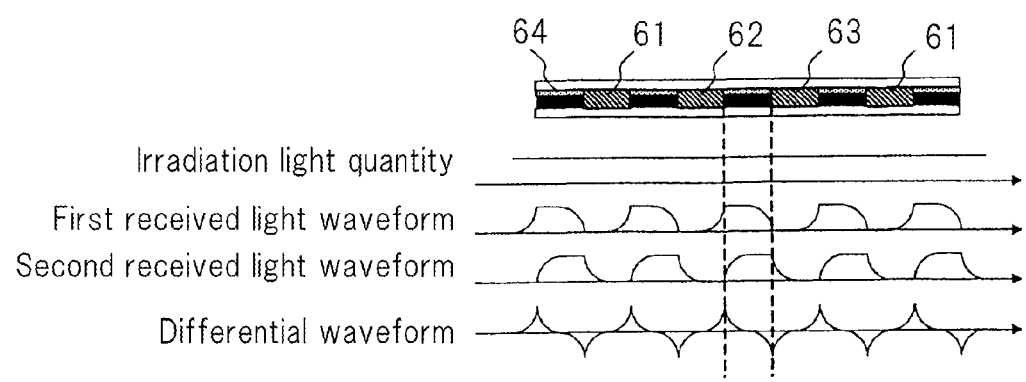
FIG. 11 is a timing chart for describing the relationship of the irradiation light amount, received light waveform, differential waveform, and boundary positions in the process of creating stripe boundary positional information at the time of the calibration shown in FIG. 10.

FIG. 11 shows the relationship among the irradiation light quantity, received light waveform, differential waveform and boundary positions at the time of calibration.

In FIG. 11, the first received light waveform is a waveform based on the first output that accords with the light quantity received at light-receiving surface 20*a* of PD 20. The second received light waveform is a waveform based on the second output that accords with the light quantity received at light-receiving surface 20*b* of PD 20. The differential waveform is a waveform that shows the difference between the first received light waveform and the second received light waveform. Each of the peak positions of this differential waveform corresponds to a boundary between phosphor regions 61-63 and retroreflective regions 64. Accordingly, the boundaries can be specified based on the peak positions (peak appearance timings) of the differential waveform.

Figure 12:
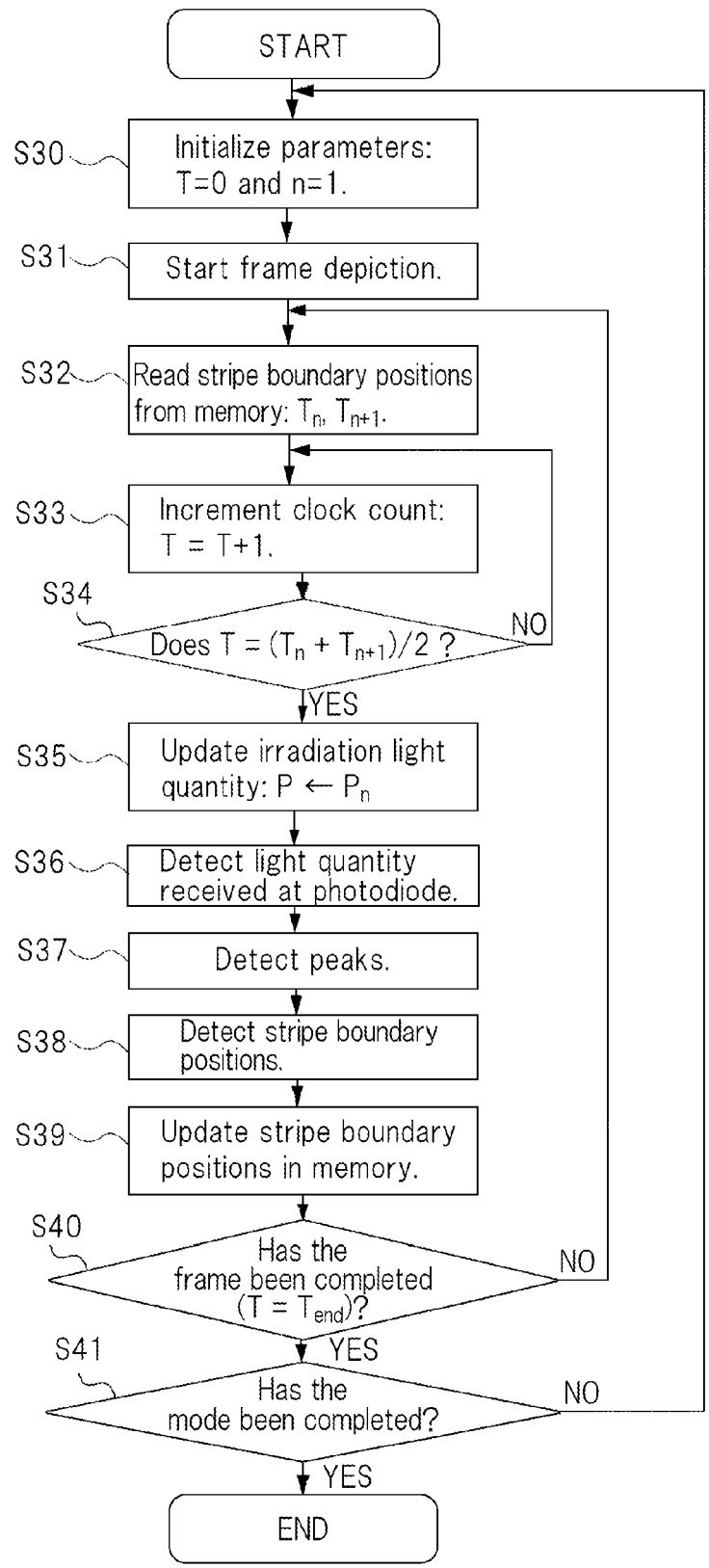
FIG. 12 is a flow chart showing the procedure of light emission timing control that is carried out in the image display mode of the image display device shown in FIG. 5.

FIG. 12 is a flow chart showing the control procedure of the light emission timing that is carried out in the image display mode.

Referring to FIG. 12, after executing calibration, irradiation timing control unit 10 first carries out initialization of parameters (T=0 and n=1) (Step S30). Here, T is the clock count value.

Irradiation timing control unit 10 next supplies a depiction start timing signal to differential detection unit 12, and further, reads the stripe boundary position ($T_n$, $T_{n+1}$) from memory 13 (Steps S31 and S32). Irradiation timing control unit 10 next increments the clock count value that is held by "1" (T=T+1) (Step S33). Then, irradiation timing control unit 10 judges whether the clock count value has reached a predetermined time interval (($T_n + T_{n+1}$)/2) (Step S34). Here, the predetermined time interval is one-half the time interval required for the light beam to pass through black stripe 60 when the light beam moves in a direction that intersects with the longitudinal direction of black stripe 60 in the optics shown in FIG. 7. In other words, the predetermined time interval corresponds to the midpoint position from both sides (boundaries) of black stripe 60 in the scanning direction.

In Step S34, when the clock count value has not reached the predetermined time interval, the process of Step S33 is again executed.

In Step S34, when the clock count value has reached the predetermined time interval, irradiation timing control unit 10 supplies a irradiation timing designation signal to laser control unit 14, and further, irradiation light quantity control unit 11 supplies a irradiation light quantity designation signal for changing the irradiation light quantity based on video signal S1 to laser control unit 14. Laser control unit 14 then controls the light emission timing of LD 50 in accordance with the irradiation timing designation signal and controls the magnitude of the drive power to LD 50 in accordance with the irradiation light quantity designation signal (Step S35). In addition, the judgment result of Step S34 is supplied to irradiation light quantity control unit 11 from irradiation timing control unit 10, and irradiation light quantity control unit 11 acquires the timing for changing the irradiation light quantity based on this judgment result.

PD 20 next detects retroreflected light 7 (Step S36), and differential detection unit 12 detects the peaks of the differential waveform of the first and second outputs from PD 20 (Step S37). Differential detection unit 12 then detects the stripe boundary positions based on the peak appearance timing of the differential waveform (Step S38). The stripe boundary positions can be found, for example, from the result of counting the time interval from the depiction start time point, up to the peak appearance time point, based on the clock signals from clock circuit 9.

Differential detection unit 12 next updates the information of the boundary positions that correspond to the stripe boundary positional information that is stored in memory 13 based on the detection results of the stripe boundary positions (Step S39).

Irradiation timing control unit 10 next judges whether the clock count value has reached the time interval (time $T_{end}$ that indicates the frame end) that corresponds to one frame interval (Step S40).

If the clock count value has not reached time $T_{end}$ in Step S40, the process of Step S32 realized by irradiation timing control unit 10 is again executed.

If the clock count value has reached time $T_{end}$ in Step S40, a judgment of whether the image display mode has ended is made (Step S41). If the image display mode has not ended, the process of Step S30 that is realized by irradiation timing control unit 10 is again executed.

Figure 13:
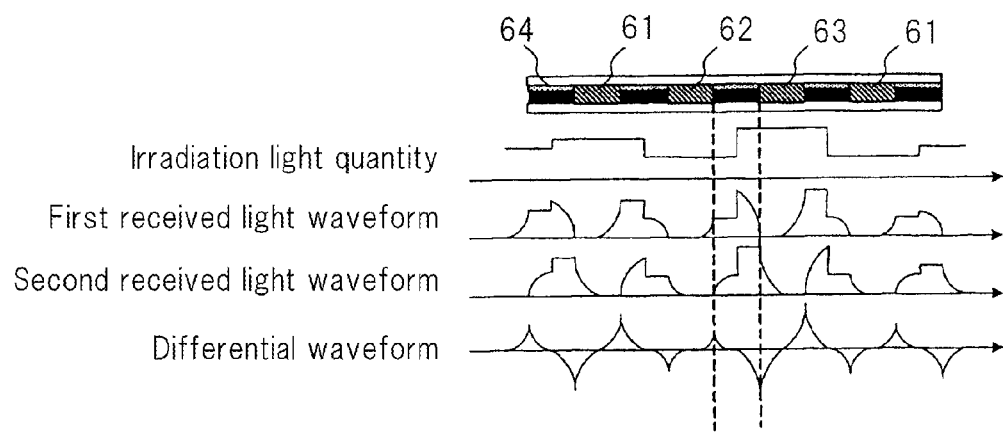
FIG. 13 is a timing chart for describing the relationship of the irradiation light amount, received light waveform, differential waveform, and boundary positions in the light emission timing control process shown in FIG. 12.

FIG. 13 shows the relationship among the irradiation light quantity, received light waveform, differential waveform and boundary positions at the time of the image display mode.

In FIG. 13, the first received light waveform is a waveform based on the first output that accords with the light quantity received at light-receiving surface 20*a* of PD 20. The second received light waveform is a waveform based on the second output that accords with the light quantity received at light-receiving surface 20*b* of PD 20. The differential waveform is a waveform that shows the difference between the first received light waveform and second received light waveform. The positions of the peaks of this differential waveform each correspond to boundaries between phosphor regions 61-63 and retroreflective regions 64. The irradiated light quantity is changed at a timing that corresponds to the midpoint position of a black stripe, and fluorescent light of a light quantity that corresponds to the irradiated quantity is produced in each of phosphor regions 61-63. By means of this type of operation, boundaries can be specified based on the differential waveform peak positions (peak appearance timings) while carrying out image display.

In the image display device of the present exemplary embodiment, as in the first exemplary embodiment, a light beam can always be irradiated into phosphor regions 61, 62, and 63 at the optimum timings. In addition, the position of the spot of the light beam in the scanning direction on fluorescent screen 6 does not have to be moved back and forth periodically by a modulated signal, and deterioration of the image quality and maximum luminance can therefore be prevented.

In addition, in the image display device of the present exemplary embodiment, the black stripes are vertical stripes, but horizontal stripes (horizontal black stripes) may also be used in their place. Horizontal black stripes intersect with or are orthogonal to vertical black stripes. In this case, light beam scanning is carried out in which the light beam crosses the horizontal black stripes diagonally on fluorescent screen 6. Light-receiving surfaces 20*a* and 20*b* are arranged along a plane that intersects with retroreflected light 7 and are aligned with a direction that corresponds to a direction that intersects with or that is orthogonal to the boundaries of phosphor regions 61, 62, and 63 and retroreflective regions 64 (or horizontal black stripes).

Third Exemplary Embodiment

The basic configuration of the image display device of the present exemplary embodiment is identical to that of the second exemplary embodiment, but the configurations of PD 20 and fluorescent screen 6 and a portion of the operation of differential detection unit 12 are different.

The characteristic configuration of the image display device of the present exemplary embodiment is next described. The configuration regarding other portions is identical to the second exemplary embodiment and detailed explanation is therefore here omitted.

Figure 14:
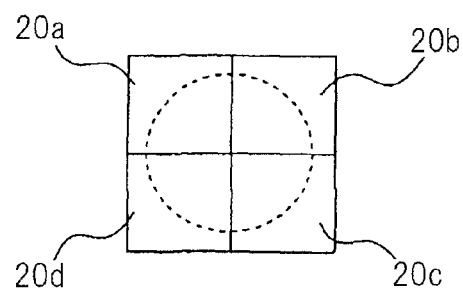
FIG. 14 is a schematic view showing the configuration of a photodiode of the image display device that is the third exemplary embodiment of the present invention.

FIG. 14 shows one example of PD 20 that is used in the image display device of the present exemplary embodiment.

Referring to FIG. 14, PD 20 is a component in which the square-shaped PD light-receiving surface is divided into four surfaces, PD 20 thus having four light-receiving surfaces 20a-20d. Light-receiving surfaces 20a-20d are square in shape and are arranged along a plane that intersects with retroreflected light 7 from retroreflective region 64. For the sake of convenience, the spot of retroreflected light 7 (the circle indicated by dotted line) is shown in FIG. 14.

Figure 15:
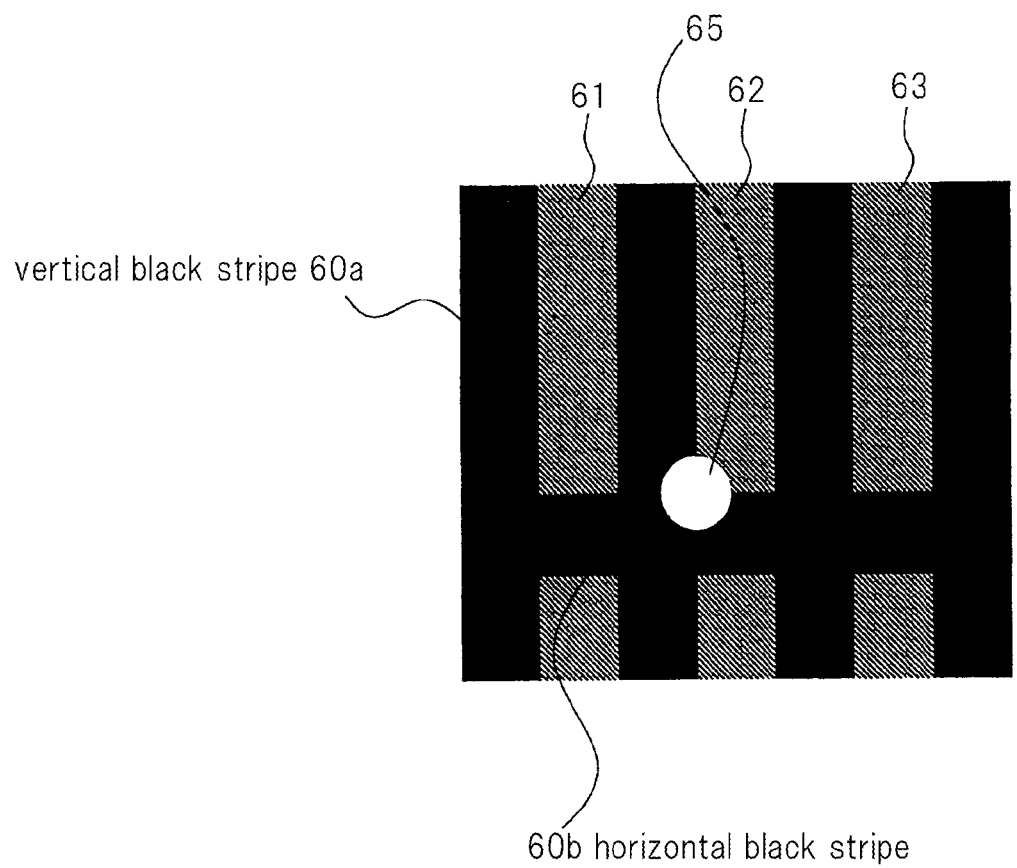
FIG. 15 is a schematic view showing a portion of the fluorescent screen of the image display device that is the third exemplary embodiment of the present invention.

FIG. 15 shows a portion of fluorescent screen 6 that is used in the image display device of the present exemplary embodiment. As shown in FIG. 15, fluorescent screen 6 includes vertical black stripes 60a and horizontal black stripe 60b that intersects with vertical black stripes 60a, phosphor regions 61-63 being regions that are partitioned by these black stripes 60a and 60b. Although not shown in FIG. 15, retroreflective regions 64 having a structure such as shown in FIG. 3A or 3B are formed in black stripes 60a and 60b.

Light-receiving surfaces 20a-20d are arranged so as to face the surface of fluorescent screen 6 in which retroreflective regions 64 are formed. When viewed from a direction perpendicular to the surface of fluorescent screen 6 on which retroreflective regions 64 are formed, light-receiving surfaces 20a and 20b are arranged aligned along a direction that intersects with vertical black stripe 60a (the scanning direction). Light-receiving surfaces 20c and 20d are also arranged aligned along a direction that intersects with vertical black stripe 60a. Light-receiving surfaces 20a and 20d are arranged aligned along the direction of extension of vertical black stripe 60a (a direction that intersects with horizontal black stripe 60b). Light-receiving surfaces 20b and 20c are also arranged aligned along the direction of extension of vertical black stripe 60a.

In PD 20, a first output that accords with the light quantity that is received at light-receiving surface 20a, a second output that accords with the light quantity received at light-receiving surface 20b, a third output that accords with the light quantity that is received at light-receiving surface 20c, and a fourth output that accords with the light quantity received at light-receiving surface 20d are separately supplied to differential detection unit 12.

Laser scanning unit 40 scans fluorescent screen 6 shown in FIG. 15 by the light beam from LD 50. On fluorescent screen 6, spot 65 of the light beam from laser scanning unit 40 moves in a direction (scanning direction) that intersects with the longitudinal direction of phosphor regions 61-63. In this scanning, spot 65 passes through the boundaries between phosphor regions 61-63 and retroreflective regions 64 on vertical black stripes 60a (hereinbelow referred to as "first stripe boundary positions") and the boundaries between phosphor regions 61-63 and retroreflective region 64 on horizontal black stripe 60b (hereinbelow referred to as "second stripe boundary position").

Differential detection unit 12 acquires a first differential waveform that indicates the difference between a first waveform in which, of the first to fourth outputs that are supplied from PD 20, the second output is added to the first output and a second waveform in which the fourth output is added to the third output. Differential detection unit 12 detects the first stripe boundary position based on this first differential waveform. In this case, the peak position of the first differential waveform corresponds to the boundary position of the first stripe.

Differential detection unit 12 further acquires a second differential waveform that indicates the difference between a third waveform in which, of the first to fourth outputs supplied from PD 20, the fourth output is added to the first output and a fourth waveform in which the third output is added to the second output. Differential detection unit 12 detects the second stripe boundary positions based on this second differential waveform. In this case, the peak position of the second differential waveform corresponds to the second stripe boundary position. The second stripe boundary position corresponds to the stripe boundary position described in the second exemplary embodiment.

In the image display device of the present exemplary embodiment, calibration and control of the light emission timing in the image display mode such as described in the second exemplary embodiment are also carried out.

In calibration, differential detection unit 12 detects the first and second stripe boundary positions, creates stripe boundary positional information that is based on these first and second stripe boundary positions, and stores the stripe boundary positional information in memory 13.

In image display mode, irradiation timing control unit 10 refers to the stripe boundary positional information that is stored in memory 13 and supplies an irradiation timing designation signal for controlling the light emission timing. The other operations (such as updating processes based on the first and second stripe boundary positions) are carried out by the same procedure as in the second exemplary embodiment.

In the image display device of the present exemplary embodiment, when viewed from a direction that is perpendicular to the surface of fluorescent screen 6 in which retroreflective regions 64 are formed, of light-receiving surfaces 20a-20d of PD 20, light-receiving surfaces 20b and 20d may be arranged aligned in a direction that intersects with vertical black stripe 60a, and light-receiving surfaces 20a and 20c may be arranged aligned in a direction that is orthogonal to this direction.

In the above-described case, differential detection unit 12 acquires a first differential waveform that indicates the difference between, of the first to fourth outputs supplied from PD 20, the first output and the third output. Based on this first differential waveform, differential detection unit 12 detects the first stripe boundary positions. In this case, the peak positions of the first differential waveform correspond to the first stripe boundary positions.

In addition, differential detection unit 12 acquires a second differential waveform that indicates the difference between, of the first to fourth outputs supplied from PD 20, the fourth output and the second output. Differential detection unit 12 detects the second stripe boundary positions based on this second differential waveform. In this case, the peak positions of the second differential waveform correspond to the second stripe boundary positions.

In the image display device of the present exemplary embodiment, fluorescent screen 6 is not limited to the structure shown in FIG. 15. In the structure shown in FIG. 15, fluorescent screen 6 may be of structure that lacks horizontal black stripes 60b (identical to the structure shown in FIG. 2). In this case, differential detection unit 12 detects the stripe boundary positions based on a differential waveform that indicates the difference between a waveform in which, of the first to fourth outputs supplied from PD 20, the fourth output is added to the first output and a waveform in which the third output is added to the second output. The detection of these stripe boundary positions is basically the same as the detection of the stripe boundary positions in the first exemplary embodiment.

In the image display device of the present exemplary embodiment, as in the first exemplary embodiment, a light beam can always be irradiated into phosphor regions 61, 62, and 63 at optimum timings. In addition, because the position of the spot of the light beam in the direction of scanning of fluorescent screen 6 does not have to be moved back and forth periodically by a modulated signal, deterioration of the picture quality and maximum luminance can be prevented.

Fourth Exemplary Embodiment

Figure 16:
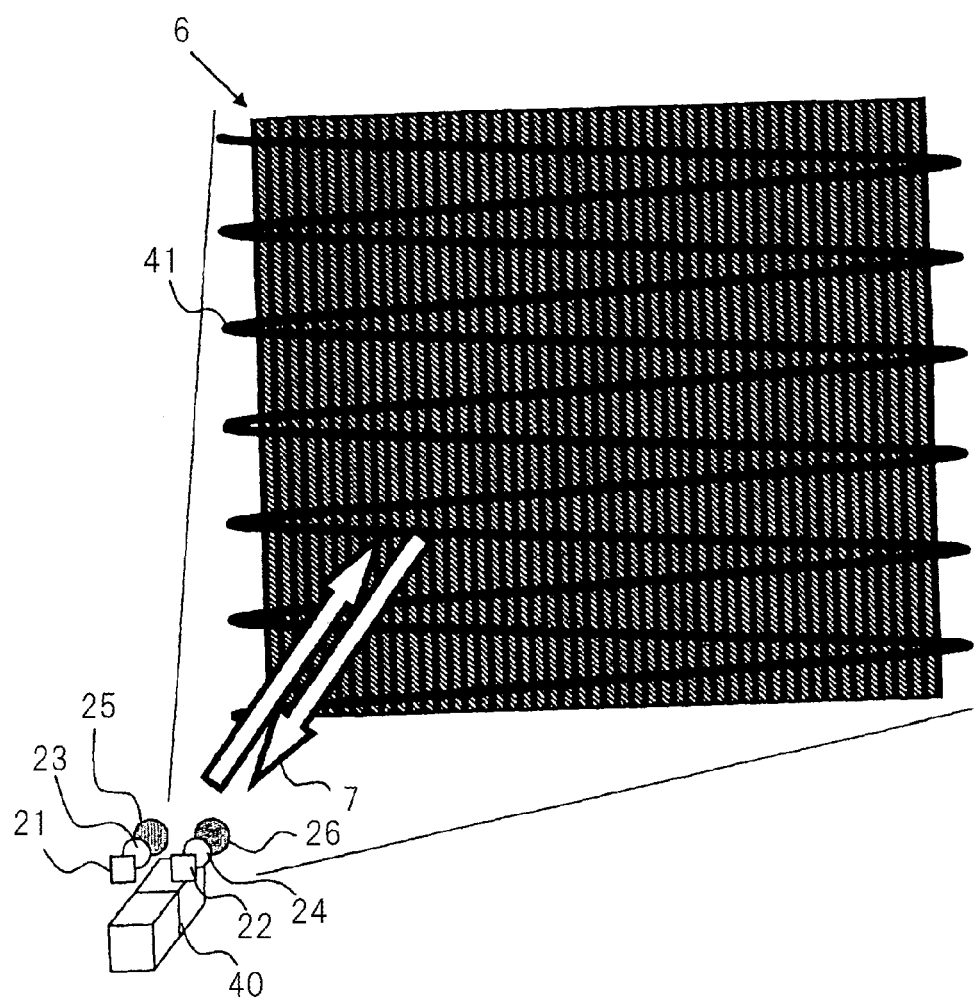
FIG. 16 is a schematic view for describing the configuration of the image display device that is the fourth exemplary embodiment of the present invention.

FIG. 16 is a schematic view describing the configuration of the image display device that is the fourth exemplary embodiment of the present invention.

The image display device of the present exemplary embodiment, apart from having optics that differ from the optics described in FIG. 7 and including two PDs 21 and 22 in place of PD 20, is identical to the image display device of the second exemplary embodiment.

Each of PD 21 and 22 corresponds to light-receiving surfaces 20a and 20b of PD 20 (or optical detection means 2 and 3 of the image display device of the first exemplary embodiment). PD 21 and 22 are arranged along a plane that intersects with retroreflected light 7 and are aligned in a direction that corresponds to a direction that intersects with or that is orthogonal to the boundaries between phosphor regions 61, 62, and 63 and retroreflective regions 64 (or vertical black stripes 60a). When viewed from the upper-surface side of laser scanning unit 40, PD 21 and 22 are arranged on both sides of the light-emission axis of laser scanning unit 40.

Condenser lens 23 is arranged at a position that faces the light-receiving surface of PD 21 and condenses a portion of retroreflected light 7 on the light-receiving surface of PD 21. Condenser lens 24 is arranged at a position that faces the light-receiving surface of PD 22 and condenses a portion of retroreflected light 7 on the light-receiving surface of PD 22.

Selection filter 25 is arranged on the incidence-surface side of condenser lens 23, and selection filter 26 is arranged on the incidence-surface side of condenser lens 24. Selection filters 25 and 26 both have the property of transmitting retroreflected light 7 and reflecting light of wavelengths that differ from retroreflected light 7 (for example, fluorescent light from phosphor regions 61-63).

The output waveforms of PD 21 and 22 and the differential waveform of these waveforms are similar to the waveforms shown in FIG. 11 and FIG. 13. The image display device of the present exemplary embodiment is able to realize the same operations as the second exemplary embodiment.

The image display device of the present exemplary embodiment, as with the first exemplary embodiment, is always able to irradiate a light beam upon phosphor regions 61, 62, and 63 at the optimum timings. In addition, the position of the spot of the light beam in the scanning direction on fluorescent screen 6 does not have to be move back and forth periodically by a modulated signal, whereby deterioration of image quality and maximum luminance can be suppressed.

Fifth Exemplary Embodiment

Figure 17:
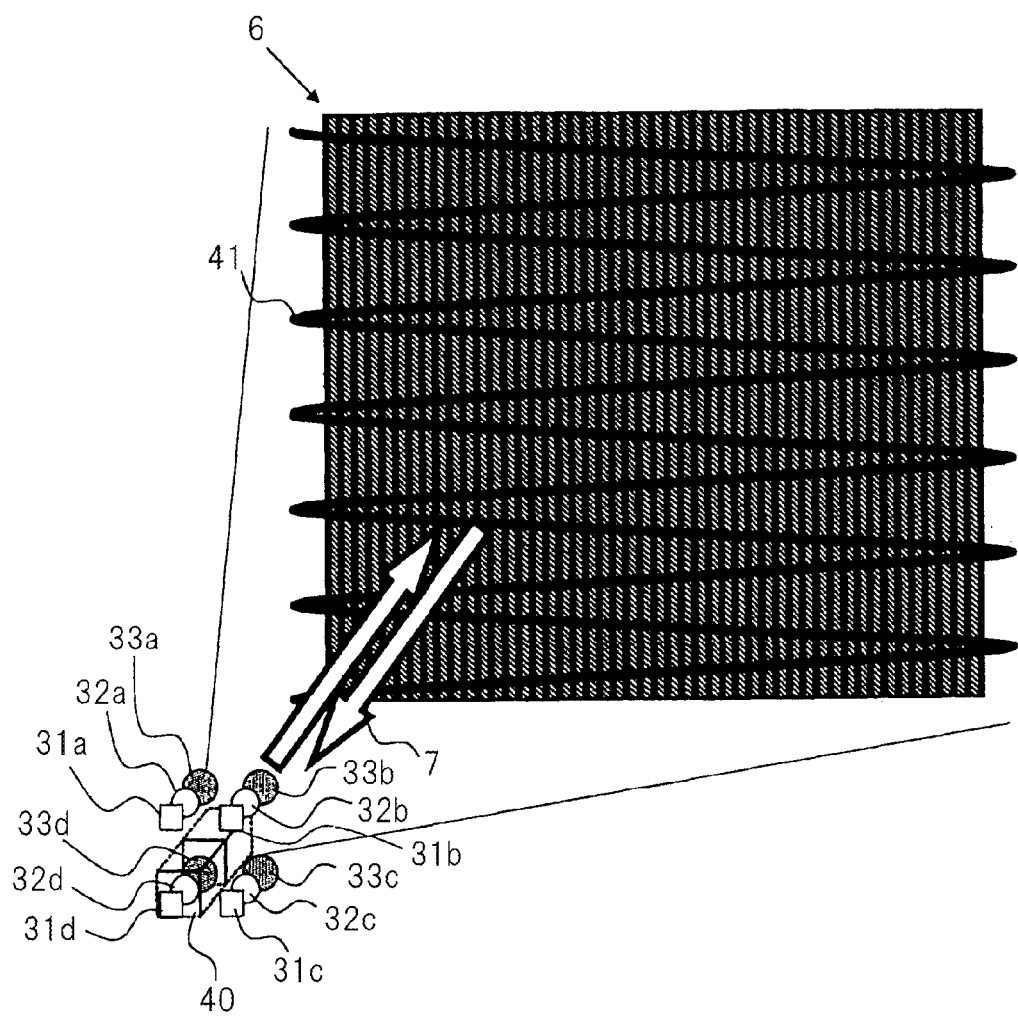
FIG. 17 is a schematic view for describing the configuration of the image display device that is the fifth exemplary embodiment of the present invention.

FIG. 17 is a schematic view describing the configuration of the image display device that is the fifth exemplary embodiment of the present invention.

The image display device of the present exemplary embodiment includes optics that differ from the optics such as shown in FIG. 7 and has four PD 31a-31d in place of PD 20 but otherwise is identical to the third exemplary embodiment.

Each of PD 31a, 31b, 31c and 31d corresponds to light-receiving surfaces 20a, 20b, 20c, and 20d, respectively, of PD 20 of the image display device of the third exemplary embodiment. PD 31a-31d are arranged along a plane that intersects with retroreflected light 7.

More specifically, PD 31a-31d are arranged to face the surfaces in which retroreflective regions 64 of fluorescent screen 6 are formed. When viewed from a direction perpendicular to the surface in which retroreflective regions 64 of fluorescent screen 6 are formed, PD 31a and 31b are arranged aligned in a direction that intersects with or that is orthogonal to the boundaries between phosphor regions 61, 62, and 63 and retroreflective regions 64 (or veridical black stripes 60a). PD 31c and 31d are also arranged aligned in a direction that intersects with or that is orthogonal to the boundaries. PD 31a and PD 31d are arranged aligned along the direction of extension of vertical black stripe 60a. PD 31b and 31 c are also arranged aligned along the direction of extension of vertical black matrix stripe 60a.

When viewed from the upper surface of laser scanning unit 40, PD 31a and 31b are arranged on both sides of the light emission axis of laser scanning unit 40. Similarly, PD 31c and 31d are arranged on both sides of the light emission axis of laser scanning unit 40.

Condenser lens 32a is arranged at a position that faces the light-receiving surface of PD 31a and condenses a portion of retroreflected light 7 on the light-receiving surface of PD 31a. Selection filter 33a is arranged on the incidence-surface side of condenser lens 32a.

Condenser lens 32b is arranged at a position that faces the light-receiving surface of PD 31b and condenses a portion of retroreflected light 7 on the light-receiving surface of PD 31b. Selection filter 33b is arranged on the light-incidence side of condenser lens 32b.

Condenser lens 32c is arranged at a position that faces the light-receiving surface of PD 31c and condenses a portion of retroreflected light 7 on the light-receiving surface of PD 31c. Selection filter 33c is arranged on the incidence-surface side of condenser lens 32c.

Condenser lens 32d is arranged at a position that faces the light-receiving surface of PD 31d and condenses a portion of retroreflected light 7 on the light-receiving surface of PD 31d. Selection filter 33d is arranged on the incidence-surface side of condenser lens 32d.

All of selection filters 33a-33d have the property of transmitting retroreflected light 7 and reflecting light of wavelengths that differ from that of retroreflected light 7 (for example, the fluorescent light from phosphor regions 61-63).

The image display device of the present exemplary embodiment is also capable of realizing the same operations as the third exemplary embodiment.

When viewed from a direction perpendicular to the surface in which retroreflective regions 64 of fluorescent screen 6 are formed in the image display device of the present exemplary embodiment, PD 31b and 31d may also be arranged aligned with a direction that intersects or that is orthogonal to the boundaries between phosphor regions 61, 62, and 63 and retroreflective regions 64 (or vertical black stripes 60a), and PD 31a and 31c may be arranged aligned with a direction that is orthogonal to this direction. In this case, the same operations are carried out as for a case in which light-receiving surfaces 20a and 20d are arranged aligned with a direction that intersects or that is orthogonal to the above-described boundaries and light-receiving surfaces 20a and 20c are arranged with a direction that is orthogonal to this direction in the third exemplary embodiment.

Fluorescent screen 6 in the image display device of the present exemplary embodiment is not limited to the construction shown in FIG. 15. In the construction shown in FIG. 15, fluorescent screen 6 may lack horizontal black stripes 60b (the same construction as shown in FIG. 2). In this case, stripe boundary positions are detected based on the differential waveform that indicates the difference between a waveform in which the output of PD 31d is added to the output of PD 31a and a waveform in which the output of PD 31c is added to the output of PD 31b. The detection of these stripe boundary positions is basically the same as the detection of stripe boundary positions in the first exemplary embodiment.

In the image display device of the present exemplary embodiment, as in the first exemplary embodiment, a light beam can always be irradiated into phosphor regions 61, 62, and 63 at optimum timings. In addition, because the position of the spot of the light beam need not be moved back and forth periodically in the scanning direction of fluorescent screen 6 by a modulated signal, deterioration of the image quality or maximum luminance can be suppressed.

Although the present invention has been described hereinabove with reference to exemplary embodiments, the present invention is not limited to the above-described exemplary embodiments. The configuration and operations of the present invention are open to various modifications within a scope that does not depart from the gist of the present invention that will be clear to one of ordinary skill in the art.

This application claims the benefits of priority based on Japanese Patent Application No. 2010-100784 for which application was submitted on Apr. 26, 2010 and incorporates by citation all of the disclosures of that application.

What is claimed is:

1. An image display device comprising:
   an excitation light source;
   a fluorescent screen that is provided with a plurality of phosphor regions arranged periodically in the in-plane direction, regions between each of phosphor regions being reflection regions that reflect incident light in a direction opposite the direction of incidence of the light;
   a scanning unit that, by means of a light beam from said excitation light source, scans the surface of said fluorescent screen on which each of said phosphor regions is formed;
   first and second optical detection units that detect reflected light that is reflected by said reflection regions; and
   a differential detection unit that detects said boundaries base don a differential waveform that indicates the difference between outputs of said first and second optical detection units;
   an irradiation timing control unit that outputs an irradiation timing designation signal that indicates light emission timing of said excitation light source based on the detected boundaries; and
   a laser control unit that controls the light emission timing of said excitation light source in accordance with the irradiation timing designation signal,
   wherein said first and second optical detection units are arranged along a plane that intersects with said reflected light aligned in a first direction that is a direction that intersects with said boundaries, the first direction being determined by a relative positional relationship with said fluorescent screen.

2. The image display device as set forth in claim 1, wherein said differential detection unit detects said boundaries based on the timings of appearance of peaks of the differential waveform.

3. The image display device as set forth in claim 1, wherein said laser control unit both causes repeated implementation of scanning of said entire fluorescent screen by means of said scanning unit and, based on said boundaries that are detected based on outputs of said first and second optical detection units at the time of current scanning, controls light emission timing of said excitation light source at the time of the next scanning by said scanning unit.

4. The image display device as set forth in claim 1, further comprising a memory; wherein:
   said laser control unit both causes emission of excitation light of a fixed light quantity from said excitation light source and causes scanning by said scanning unit, and said differential detection unit stores in said memory boundary positional information that contains positional information of boundaries that are detected; and
   said laser control unit both causes scanning by said scanning unit according to an input video signal and, based on boundary positional information stored in said memory, controls light emission timing of said excitation light source.

5. The image display device as set forth in claim 4, wherein said laser control unit causes excitation light of a light quantity that accords with said input video signal to be emitted from said excitation light source, and causes scanning by said scanning unit,
   wherein said differential detection unit detects said boundaries based on outputs of said first and second optical detection units, and, based on the detected boundaries, updates said boundary positional information that is stored in said memory.

6. The image display device as set forth in claim 1, wherein the light-receiving surface of said first optical detection unit is one light-receiving surface of a photodiode in which the light-receiving surface is split into two and the light-receiving surface of said second optical detection unit is the other light-receiving surface of said photodiode.

7. The image display device as set forth in claim 1, further comprising third and fourth optical detection units that detect reflected light that has been reflected by said reflection regions;
   wherein said third and fourth optical detection units are arranged along said plane aligned in said first direction,
   wherein said laser control unit
   causes scanning by means of said scanning unit,
   wherein said differential detection unit:
   acquires each of: a first differential waveform that indicates the difference between a first added output in which output of said second optical detection unit is added to output of said first optical detection unit and a second added output in which output of said fourth optical detection unit is added to output of said third optical detection unit; and a second differential waveform that indicates the difference between a third added output in which output of said fourth optical detection unit is added to output of said first optical detection unit and a fourth added output in which output of said third optical detection unit is added to output of said second optical detection unit;
   based on said first differential waveform, acquires first boundaries between each of said phosphor regions and said reflection regions in a direction that is orthogonal to the direction of said scanning;

and based on said second differential waveform, acquires second boundaries between each of said phosphor regions and said reflection regions in the direction of said scanning; and wherein said laser control unit controls light emission timing of said excitation light source based on said first and second boundaries.

8. The image display device as set forth in claim 7, wherein said differential detection unit detects said first boundaries based on peak positions of said first differential waveform and detects said second boundaries based on peak positions of said second differential waveform.

9. The image display device as set forth in claim 7, wherein said laser control unit both causes repeated scanning of said entire fluorescent screen by means of said scanning unit and controls light emission timing of said excitation light source at the time of next scanning by means of said scanning unit based on said first and second boundaries that are detected based on said first and second differential waveforms at the time of current scanning.

10. The image display device as set forth in claim 7, further comprising a memory; wherein said laser control unit
both causes emission of excitation light of a fixed light quantity from said excitation light source and causes scanning by means of said scanning unit,
wherein said differential detection unit acquires said first and second boundaries from said first and second differential waveforms and stores boundary positional information that contains positional information of first and second boundaries that were acquired in said memory, and
wherein said laser control unit both causes scanning by means of said scanning unit according to an input video signal and controls light emission timing of said excitation light source based on boundary positional information that is stored in said memory.

11. The image display device as set forth in claim 10, wherein said laser control unit causes emission of excitation light of a fixed light quantity from said excitation light source according to said input video signal, and causes scanning by means of said scanning unit, and
wherein said differential detection unit detects said first and second boundaries, and updates said boundary positional information that is stored in said memory based on the first and second boundaries that were detected.

12. The image display device as set forth in claim 1, further comprising third and fourth optical detection units that detect reflected light that has been reflected by said reflection regions,
wherein said third and fourth optical detection units are arranged along said plane aligned in a direction that is orthogonal to said first direction,
wherein said laser control unit
causes scanning by means of said scanning unit,
wherein said differential detection unit:
acquires each of: a first differential waveform that indicates the difference between output of said first optical detection unit and output of said second optical detection unit; and a second differential waveform that indicates the difference between output of said third optical detection unit and output of said fourth optical detection unit;
based on said first differential waveform, acquires first boundaries between each of said phosphor regions and said reflection regions in the direction of said scanning; and based on said second differential waveform, acquires second boundaries between each of said phosphor regions and said reflection regions in a direction that is orthogonal to the direction of said scanning, and
wherein said laser control unit controls light emission timing of said excitation light source based on said first and second boundaries.

13. The image display device as set forth in claim 12, wherein each of light-receiving surfaces of said first to fourth optical detection units is made up of a respective light-receiving surface of a photodiode in which the light-receiving surface has been divided into four surfaces.

14. The image display device as set forth in claim 12, wherein said differential detection unit detects said first boundaries based on peak positions of said first differential waveform and detects said second boundaries based on peak positions of said second differential waveform.

15. The image display device as set forth in claim 12, wherein said laser control unit both causes repeated scanning of said entire fluorescent screen by means of said scanning unit and controls light emission timing of said excitation light source at the time of next scanning by means of said scanning unit based on said first and second boundaries that are detected based on said first and second differential waveforms at the time of current scanning.

16. The image display device as set forth in claim 12, further comprising a memory; wherein said laser control unit
both causes emission of excitation light of a fixed light quantity from said excitation light source and causes scanning by means of said scanning unit,
wherein said differential detection unit acquires said first and second boundaries from said first and second differential waveforms and stores boundary positional information that contains positional information of first and second boundaries that were acquired in said memory, and
wherein said laser control unit both causes scanning by means of said scanning unit according to an input video signal and controls light emission timing of said excitation light source based on boundary positional information that is stored in said memory.

17. The image display device as set forth in claim 12, wherein each of light-receiving surfaces of said first to fourth optical detection units is made up of a respective light-receiving surface of a photodiode in which the light-receiving surface has been divided into four surfaces.

18. A light emission timing control method comprising:
scanning, by means of a light beam from an excitation light source, a surface of a fluorescent screen on which each of phosphor regions are formed, said fluorescent screen being provided with a plurality of phosphor regions that are arranged periodically in the in-plane direction, regions between each of the phosphor regions being reflection regions that bend incident light in a direction that is opposite the direction of incidence of the light;
detecting reflected light from said reflection regions at the time of said scanning using first and second optical detection units that are arranged along a plane that intersects said reflected light aligned in a first direction that is a direction that intersects boundaries between each of said phosphor regions and said reflection regions, the first direction being determined by a relative positional relationship with said fluorescent screen;
detecting boundaries between each of said phosphor regions and said reflection regions on said fluorescent screen based on a differential waveform that indicates the difference between outputs of said first and second optical detection units
generating an irradiation timing designation signal that indicates light emission timing of said excitation light source based on the detected boundaries; and
controlling the light emission timing of said excitation light source in accordance with the irradiation timing designation signal.

* * * * *